(12) United States Patent
Cha et al.

(10) Patent No.: US 7,150,894 B2
(45) Date of Patent: Dec. 19, 2006

(54) ACID WHEY TEXTURE SYSTEM

(75) Inventors: Alice S. Cha, Northbrook, IL (US);
Jimbay Loh, Green Oaks, IL (US);
Timothy Nellenback, Palatine, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 598 days.

(21) Appl. No.: 10/427,567

(22) Filed: May 1, 2003

(65) Prior Publication Data

US 2004/0219273 A1    Nov. 4, 2004

(51) Int. Cl.
*A23C 9/15* (2006.01)
(52) U.S. Cl. ............... 426/580; 426/519; 426/573; 426/583; 426/586
(58) Field of Classification Search ............ 426/519, 426/573, 580, 583, 586
See application file for complete search history.

(56) References Cited

U.S. PATENT DOCUMENTS

| | | |
|---|---|---|
| 2,387,276 A | 10/1945 | Link |
| 2,699,995 A | 1/1955 | Hull |
| 3,642,492 A | 2/1972 | Arndt |
| 3,840,996 A | 10/1974 | Grindstaff et al. |
| 3,873,751 A | 3/1975 | Arndt |
| 4,297,382 A | 10/1981 | Hosaka |
| 4,497,836 A | 2/1985 | Marquardt et al. |
| 4,617,861 A | 10/1986 | Armstrong |
| 6,416,797 B1 | 7/2002 | Han et al. |

FOREIGN PATENT DOCUMENTS

| | | |
|---|---|---|
| CH | 416 506 | 7/1966 |
| DE | 1 239 551 | 4/1967 |
| EP | 1472931 A1 * | 11/2004 |
| FR | 2 406 955 | 5/1979 |
| GB | 1 282 502 | 7/1972 |
| GB | 2 190 273 | 11/1987 |

OTHER PUBLICATIONS

Igoe et al., "Utilization of Cottage Cheese Whey in Ice Cream", *Dairy and Ice Cream Field*, vol. 156, No. 5, 61-68 (1973).
Jelen et al., "Utilization of Cottage Cheese Whey in Processed-Cheese-Like Dairy Spreads", *Egyptian Journal of Dairy Science*, vol. 9, No. 2, 159-170 (1981).

* cited by examiner

*Primary Examiner*—Leslie Wong
(74) *Attorney, Agent, or Firm*—Fitch, Even, Tabin & Flannery

(57) ABSTRACT

The present invention relates to a method for directly using acid cheese whey and/or its by-products from conventional cheese production to make additional food products. More particularly, the present method provides an economical way to profitably utilize a traditional waste or by-product in the manufacture of cream cheese or other high-value added products without re-culturing, without combining with cheese curd, without neutralizing, and without the disposal or recycling costs common in the industry.

24 Claims, 2 Drawing Sheets

Cream Cheese Process Comparison

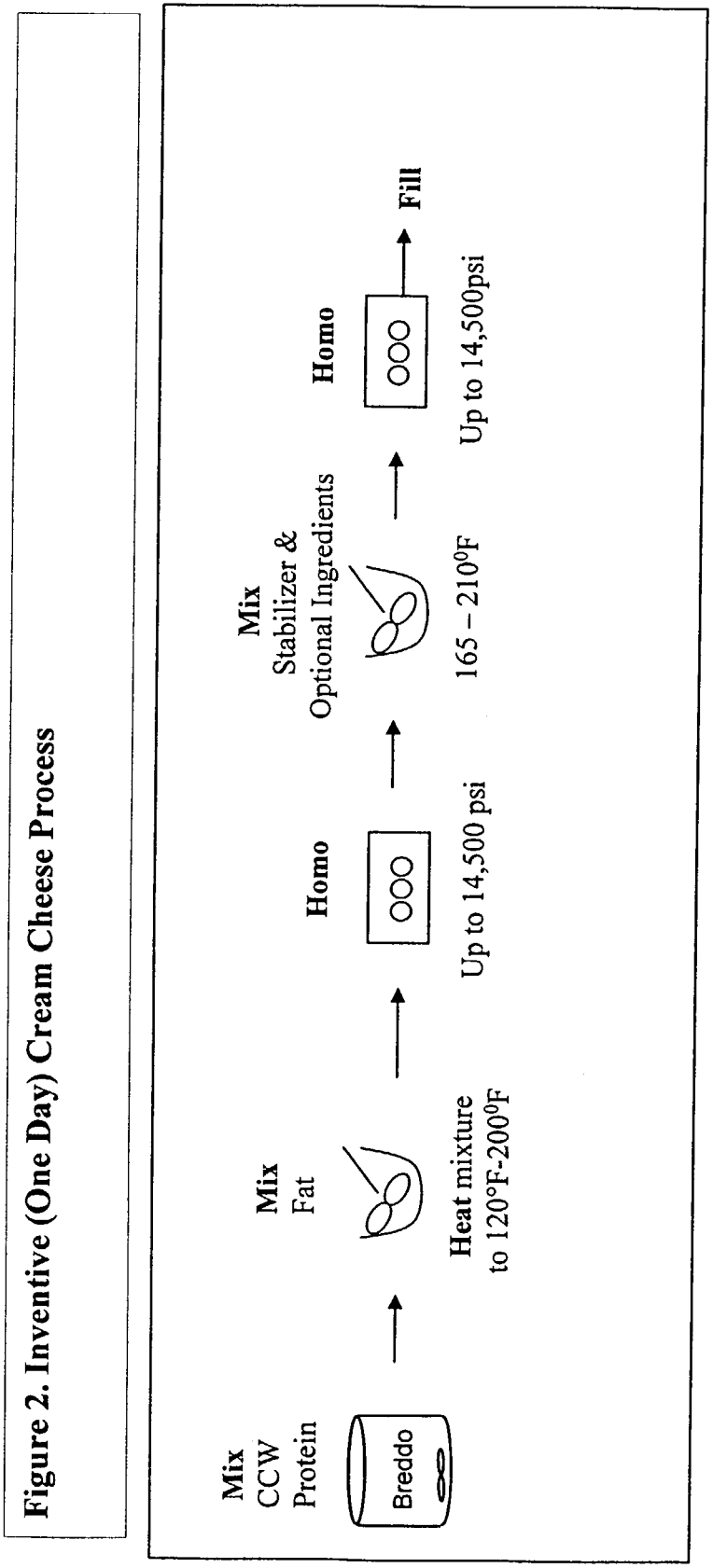

ACID WHEY TEXTURE SYSTEM

FIELD OF THE INVENTION

The present invention relates to a method for making food products directly using acid whey and/or acid whey by-products, and a suitable edible fat source. More particularly, the present method provides an economical way to utilize a traditional waste or by-product in the manufacture of cream cheese products or other related high-value-added cheese products without the need for re-culturing, without combining with additional cheese curd, without neutralizing (with an alkali) and without the recycling or the disposal costs common in the industry. In addition, the present invention recovers and uses all or part of the natural dairy flavors, proteins, fats, edible acids, vitamins and dairy calcium and other minerals which otherwise are lost in a waste stream.

BACKGROUND TO THE INVENTION

Cheese compositions are generally prepared from dairy liquids by processes that include treating the liquid with a coagulating or clotting agent. The coagulating agent may be a curding enzyme, an acid, or a suitable bacterial culture or it may include such a culture. The coagulum or curd that results generally incorporates casein that has been suitably altered by the curding process, fats including natural butter fat, and flavorings arising during the processing (especially when using a bacterial culture as the coagulating agent). The curd is usually separated from the whey. The resulting liquid whey generally contains soluble proteins not affected by the coagulation; such proteins are, of course, not incorporated into the coagulum, because they are solubilized in the liquid whey.

The making of cheese is generally a labor-intensive process that requires large quantities of milk to develop any of the many popular varieties. Typically, cheese yields range from 6% to 12% depending upon the variety and moisture content of cheese. The remainder of the milk forms by-products. Whey is the single largest by-product from the milk during the cheese making process and, has often been viewed as a waste or low value by-product. Additionally, the whey contains potentially valuable components which are often lost. The whey protein is often dried or otherwise processed to remove it from the liquid whey. In the recent past, estimates for a commercial whey drier were typically in a range of about 5 to 10 million U.S. dollars. Commercial whey driers are also expensive from the standpoint of space and energy requirements. Commercial whey driers are typically large, and consume lots of energy.

Historically, cheese whey has been separated from curd and oftentimes discarded, sold or partly re-processed for recycling in a conventional cream cheese process. This typically is regarded as being not economical or feasible in some cases. In fact, unlike sweet whey from natural cheese manufacturing, the acid whey from cream cheese and cottage cheese has been deemed undesirable even for conversion or reprocessing into dry whey powder or whey protein concentrate due to its strong acid taste and for being impractical. In the conventional processes for making cream cheese, whey is formed and removed as mentioned in U.S. Pat. No. 6,416,797. Early efforts focused on better systems for separating whey from cheese curds are described in U.S. Pat. No. 2,387,276. Numerous other systems have been proposed over the years for separating the whey protein from liquid cheese whey. For example, various mechanisms for separating the whey from the liquid are disclosed in U.S. Pat. Nos. 3,642,492; 3,840,996; 3,873,751; 4,297,382; 4,497,836 and 4,617,861, to name only a few. Of course, several such systems may be used in conjunction with one another to separate and dry the whey protein.

Disposal of the whey is costly and difficult because the high protein and lactose content in cheese whey and high biological oxygen demand (BOD) can quickly contaminate wells and local streams and rivers. The high protein concentration can cause algae blooms in surface waters, and can render ground water unusable for many purposes.

Others have synthesized specially engineered proteins from cheese whey. There is, however, a limited demand for such proteins from acid whey due to its objectionable acidic off taste. When acidic whey or its by products (such as acid whey concentrate) are used in formulating food products, a neutralization step with an alkali (such as sodium hydroxide) is typically required. Consequently, excessive saltiness often results thus limiting its use.

Still other approaches rest on an appreciation that the high protein concentration of the whey might be desirable for use in health drinks and other nutritional snacks. However, the market for such specialty products is generally insufficient to keep whey protein prices adequate in comparison to their cost of production. This is due, in part, to the properties of the whey protein. Thus, it was estimated a few years ago that while cheese solids in mozzarella could be worth about $2.40–$3.60 (U.S.) per pound, the whey protein concentrate (34% protein) then could sell for about $0.58 (U.S.) per pound. Thus, due to the costs associated with drying and handling, the cheese producer usually sells its whey protein at a loss.

While some differences in costs might seem small, overall the costs are significant, especially since each year millions of pounds of acid whey are produced as a by-product. Added to that are the costs associated with the numerous steps required to turn milk into cheese having the desired characteristics of color, body, texture and organoleptic properties. Many of these steps are highly labor intensive and limit the speed and cost at which cheese can be produced. Additionally, success or failure in the market place is often determined by a company's ability to create cheese with the proper body, texture and organoleptic properties at the most competitive price. Because of the highly competitive nature of the cheese making industry, price differences of less than one cent per pound can provide significant advantages in the market place.

Thus, there has been a long-standing need for a method and related technology that can more effectively utilize acid whey obtained during the cheese making process to thereby increase profitability. Such a system should have reduced or no negative environmental impacts and should be relatively easy to use. It should be more energy effective. It should allow maximum recovery of cultured flavors, acids and dairy nutrients (e.g., minerals and vitamins) from the whey stream. It should yield cream cheese-like products and enable creation of other novel value-added dairy products with enhanced dairy flavors and nutrients having at least a potential to appeal and be accepted by customers and consumers. It should desirably yield products without wide variation in product characteristics. Because of the price sensitivity of the cheese market, the most profitable return for whey protein would be to return it into a cheese thereby increasing yield. The present invention provides such methods and products.

SUMMARY OF THE INVENTION

The present invention provides a facile, more economical way of directly utilizing acid whey without having to incur the cost-penalties conventionally associated with the disposal of, selling or re-processing of the by-product acid whey, which is generated during the manufacture of cheeses, such as cream cheeses.

In one embodiment, the method provides for directly preparing a cream cheese-like product from acid whey, such as acid whey generated from the manufacture of cheese, such as cream cheese, and a suitable edible fat source. Advantageously, the method can be scaled up to industrial scale for a shortened (less than one-day) production cycle, as compared to a conventional two day production cycle for manufacturing cream cheese products by essentially eliminating the culturing or fermentation step used in conventional production. In an aspect of this embodiment, the method offers the further advantages of avoiding both a need to repeat a conventional culturing step and to use cream cheese curd. Thus, the invention provides a curdless, cream cheese-like product with characteristic, full cultured dairy flavors and acids from the concentrated acid whey.

In a further embodiment, the acid whey can advantageously be used to manufacture new commercially attractive products, while also avoiding a conventional culturing step and the use of cheese curd. More particularly, the acid whey can be used directly in manufacturing sour cream, other cheese products, enhancers, spreads, sauces, dressings, desserts, dairy beverage (such as smoothies), and other value-added food products.

BRIEF DESCRIPTION OF THE FIGURES

FIG. 2 illustrates an embodiment of the present invention relating to a 5-step, one-day process for manufacturing a cream cheese product without culturing while eliminating whey recycling to cheese curd.

DETAILED DESCRIPTION OF THE INVENTION

Figure 1:
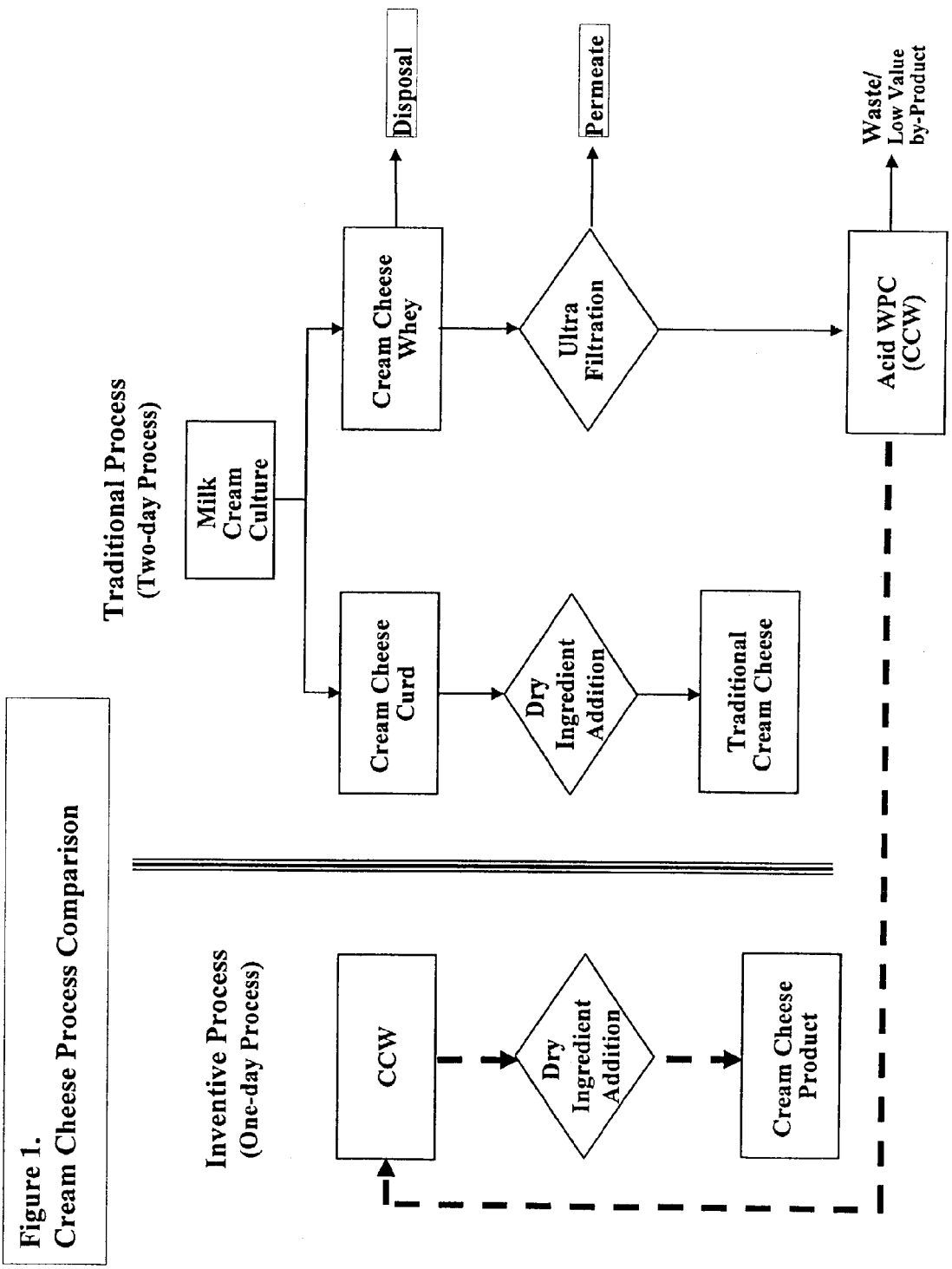
FIG. 1 illustrates an exemplary traditional process for manufacturing soft cream cheese.

The present methods include a first embodiment in which homogenized and heat treated acid whey, such as the acid whey that is generated during the manufacture of cream cheese-like products, can be successfully processed to form a novel product capable of conferring creamy texture and providing cultured dairy notes. In an aspect of this embodiment, a blend (mixture) of concentrated acid whey and an acceptable fat (or source of fat) is formed and then subjected to a homogenization and heat treatment thereby producing a cheese product suitable for consumption. In another aspect of this embodiment, a blend (mixture) of acid cheese whey and an acceptable fat (or source of fat) is formed and then subjected to homogenization and heat treatment, thereby providing a soft cream cheese product suitable for consumption.

Forms of acid whey suitable for use in this invention include, for example, acid whey (not concentrated) and/or concentrated acid whey from any cheese making process (including but not limited to cream cheese and cottage cheese making processes). Concentrated acid whey can be obtained by conventional means such as concentrating by evaporation, filtration, reverse osmosis, and the like, although ultrafiltration may be preferred, and it can be obtained by fermentation or acidification. The compositions and selected properties of exemplary concentrated cream cheese whey (CCW) obtained via ultrafiltration and acid whey (from centrifuging a fermentation product) obtained from conventional cream cheese products are as follows:

|  | CCW | Acid Whey |
| --- | --- | --- |
| pH | 4.42 | 4.40 |
| Acidity (%) | 0.88 | 0.46 |
| Moisture (%) | 84.2 | 96.0 |
| Fat % | 3.21 | 0.15 |
| Protein (%) | 6.7 | 0.6 |
| Lactose (%) | 3.1 | 1.7 |
| Calcium (ppm) | 920 | 687 |
| Potassium (ppm) | 1150 | 1280 |
| Sodium (ppm) | 375 | 227 |

In general, the CCW and acid whey typically include natural dairy flavors, edible acids, and water soluble vitamins, such as riboflavin, thiamin, niacin, pantothenic acid, B6, B12 and C, and minerals (i.e. calcium, phosphate, potassium, etc.)

Acid whey can be obtained from cultured or direct acidified dairy products such as cream cheese, cottage cheese, ricotta cheese, Neufachatel cheese and the like. Generally, concentrated acid whey may contain about 5 to about 40% solids, 0.5 to 20% protein, 0.1 to about 20% fat and 5 to 40% lactose. In general, a concentrated cream cheese whey may have a solids content of about 5 to about 40%, preferably about 10 to 25%, a fat content of less than about 20%, generally about 0.1 to about 20% and preferably about 1 to about 12%, and a protein concentration of about 0.5% to about 20%, more particularly about 0.5% to about 12%, and preferably about 3% to about 8%.

The precise compositions of the various by-products may, of course, vary depending on the original cheese formulation, separation (whey from curd) efficiency and concentration factors and methods, which may include separation, ultrafiltration, diafiltration, reverse osmosis, and microfiltration. An initial analysis of such by-products, which may be used in the present invention, will determine whether adjustments, such as adding a base or acid to adjust the pH, are desired by the practitioner of the present methods. The pH can suitably be in a range near the isoelectric point of milk. Typically, the pH, is in a range of about 3.5 to about 5.5, although a pH about 4.6 to 5.2 may be desired for some applications.

Generally, the acid whey is a concentrated cream cheese whey and it will have sufficient acidity and sufficient residual lactic acid that it can be used without further adjustment. Concentrated cream cheese whey can be made by ultrafiltration or other suitable methods from the by-products from conventional cream cheese production. The former is sometimes known as UF (or ultra filtered) acid whey. The pH in the above ranges is preferred, although the pH can be adjusted as necessary or desired by an amount of suitable inorganic or organic acid that is added to the composition. An organic acid suitable for incorporation in a food product (such as lactic acid, citric and the like) can be added so as to supplement the residual lactic acid in the UF acid whey.

The protein concentration in the final product will be at least partially dictated by the protein concentration of the starting materials. The protein concentration can, if desired, be augmented by the addition of a suitable dairy protein or other edible protein to the concentrated cream cheese whey.

Other edible non-dairy proteins, such as soy, gelatin, and other vegetable proteins can be added with the dairy protein. By present preference, a suitable additional source of dairy protein comprises powdered concentrated whey, known in the trade as "WPC" (whey protein concentrate), which is available in grades having protein concentrations (dry basis) of about 34, 50, 70 and up to less than about 80%. Other designations for commercially available WPC include "FDA 50" (which is a WPC containing about 50% protein) or WPC 8000 (which is a WPC containing 80% protein).

In one embodiment, cream cheese whey by-product from a conventional cream cheese production can be used directly in a "one-day" process for making soft cream cheese without a separate culturing step while at least substantially, if not completely, eliminating whey recycling. The selected cream cheese whey can be in liquid form or a combination of liquid UF acid whey and a WPC.

The whey concentrate (UF acid whey alone or in combination with a WPC) is introduced into a suitable mixer, such as a so-called Breddo mixer, and sufficient media is added to bring the blend to a desired consistency, which may be characterized as a smooth, pumpable dispersion. The selected media is by present preference water. This mixing can be performed at any suitable temperature, although for economy it may be performed at an ambient temperature about 68° F. to 72° F.

Hereinafter is described a methodology to form a smooth dispersion: mixing, first step heating, first homogenization, second step heating, and second homogenization collectively are designated a "five-step process," an embodiment of which is outlined in FIG. 2. It is understood that not all five steps are required to produce some products. For cream cheese like products, first homogenization and second heating are important texturization steps. For creamy, thick dairy beverages, including a smoothie, not all steps depicted in FIG. 2 are required. For instance, one of the embodiments for making a creamy, thick dairy beverage, such as a smoothie, involves forming the initial dispersion, heating under suitable conditions (such as conditions for the 'second' heating) and, optionally, homogenizing under suitable conditions (such as conditions for the second homogenization) before collecting the product. The blend is combined with a selected source of fat, such as dairy fat, natural and partially hydrogenated edible oil(s) and the like. It will be appreciated that the blend and/or the source of fat may, if desired, be preheated separately, prior to their combination, such as to a temperature of about 110° F. Non-dairy fats, such as vegetable, animal fats or oils, which can be hydrogenated or partially hydrogenated, may be used. By present preference, a dairy fat is used. Illustrative dairy fat sources include anhydrous milk fat (AMF) and/or concentrated milk fat (CMF), among others. It is possible to include other fat-containing materials, such as dry cream, along with or as the fat source. The ingredients can be combined with the mix in the first mixing apparatus, if desired. However, the mix and the edible fat (or fat source) may be combined together in a separate kettle, such as a Groen kettle.

The combination can be heated in a first heating treatment to a temperature in the range of about 120° F. to about 200° F., preferably from about 135° F. to 145° F. up to about 180° F. Even more preferably, this range is about 135° F. to about 145° F. Suitable first stage heat times can range, for instance, from about 2 seconds to about 20 minutes, with the time selected being readily adjusted as will be appreciated by those skilled in the art. The blend can be held at such temperature for such time as sufficient to melt the fat and hydrate the added ingredients. Although the temperature can be raised fairly rapidly, the temperature raising rate can, if desired, be more conservatively raised as to avoid excessive localized hot spots. The kettle is also preferably equipped with a stirrer or similar mechanism to mix, that is blend, the combined materials to better ensure both their uniform distribution and to avoid hot spots.

Next, the blend from the first heat stage is homogenized at a pressure up to about 14,500 psi, generally from about 2,500 psi to about 14,500 psi. A two-stage homogenizer is preferred. All homogenization pressures specified hereafter refer to the first stage homogenization unless otherwise indicated. For cream cheese-like products, the pressure is preferably from about 5000 psi to about 10,000 psi. A homogenization pressure at a higher pressure within the foregoing ranges can be selected to achieve a thicker product. For instance a softer, more creamy product can be obtained at lower or more moderate homogenization pressures such as about 3,000 psi to about 3500 psi. As will be appreciated, typically, flow rate and valve settings are adjusted to achieve the desired results herein and the homogenization pressure may be used as a control in the present method.

It is preferred to add one or more selected stabilizers (hydrocolloid(s) such as gum, starch, maltodextrin and the like) or texture modifiers (such as an emulsifier and the like). One or more other additives, which may include salt, sweeteners (natural and/or artificial), colorants, flavorings and condiments, can also be added if desired. These ingredients can be added at any suitable point in the present method. These ingredients can be added singly or in combination(s) to the homogenized blend in a suitable mixer. Sweeteners can be added based on the desired sweetness of the product. Generally, such sweeteners will be added at levels of about 0% up to about 20%, such as in a range of about 0.01 to about 20%. Of course, intense sweeteners, such as aspartame and the like, will be generally added in only very small amounts. Natural sweeteners include, for instance, sugar and a high fructose corn syrup (HFCS). Fruit puree, or juice concentrates (such as Strawberry Puree 28 Brix from Kerr Concentrates, Inc., Oregon) can be used. Generally such concentrates are blended into the product just before filling and packaging.

Generally, the level of added stabilizer (or stabilizer package) is in an amount which may be less than approximately 5.0% percent by weight. The current Federal Standards of Identity can be taken into account in determining the level of added stabilizer. Stabilizers can include food-grade hydrocolloid. Exemplary stabilizers can be chosen from ionic or non-ionic gums such as locust bean gum, guar gum, tara gum, konjac gum, xanthan gum, carrageenan, and the like; cellulose derivatives such as carboxymethylcellulose; starch such as corn starch, waxy maize starch, rice starch, potato starch, tapioca starch, wheat starch; and modified starch such as phosphorylated starch. Instant and pregelatinized starches can be used, if desired. Other exemplary ionic gums include gellan, low methoxy pectin, and alginate. In one of the preferred embodiments, the gum is xanthan due to its cold water solubility, consistent composition, availability, and low cost. For a traditional cream cheese-like product, locust bean gum can be used. It will be appreciated that one or more dextrins, such as one or more maltodextrins, can be included with a stabilizer system in an amount of up to about 20%. Maltodextrin(s) is preferably added along with a gum to enhance stability and mouth feel for a cream cheese type product. Suitable maltodextrins include those having a Dextrose Equivalence (DE) of about 2 to about 10, of which a C*deLight® commercial maltodextrin (DE about 3) from Cerestar is illustrative. It is possible to increase the initial and aged yield stress of a product by including at least one selected maltodextrin as a stabilizer in addition to hydrocolloid gum stabilizer. In one experiment, with a 0.05% xanthan gum and 0.36% carob gum combination, adding about 1.0% by weight of C*deLight® MD 01970 brand maltodextin improved the yield stress to about 1440 pascal and adding about 1.5% by weight increased the yield stress to about 1630 pascal, thereby suggesting that including a selected maltodextrin may be considered for increasing firmness of a soft cream cheese like product, for example. A Haake rheometer can be used to measure the yield stress of the cream cheese product.

Other texture modifiers may be added singly or in combination and include, for instance, emulsifiers. Ionic, high HLB (i.e. Hydrophilic Lipophilic Balance) emulsifiers are generally preferred and include sodium stearoyl lactylate, calcium stearoyl lactylate, diacetyl tartaric acid esters, and the like. Other non-ionic emulsifiers can, if desired, be used, including monoglycerol esters of fatty acids and the like. Still other emulsifiers include fatty acid esters of sucrose, fatty acid esters of propylene glycol, fatty acid esters of sorbitol, and polysorbate 60. The selected emulsifier can be added prior to the first homogenization step.

In general a salt can be added. The salt can be added with the stabilizers, if desired. The salt can optionally be added at another suitable step in the present process.

In one embodiment of the present invention, in a second heat treatment, the mixed homogenized product, which may include the selected added ingredients, is, in general, heated to a temperature of less than 212° F., such as about 165° F. to about 210° F., and preferably about 175° F. to about 185° F. The second step heat treatment is conducted for a time until the desired firmness is attained as determined by the practitioner of the present methods. Of course, the desired firmness will depend on the intended use of the final product. Suitable times may range from about 1 to about 120 minutes, although about 5 to about 30 minutes are preferred. The longer the heat treatment generally means a firmer product. Although not wishing to be bound by any particular theory, this heat treatment step is theorized as enabling protein coated fat droplets to be bound to form a three dimensional aggregated network. Too high a temperature or heat treatment for an excessive time can lead to over-aggregation and a grainy product that may not qualify commercially as a particular cheese type product, such as a cream cheese type product.

It is preferred that the temperature of the second heat treatment be greater than the temperature of the first heat treatment.

After the second heating step, a second homogenization step is preferably conducted. The second homogenization step can be conducted under such pressure and time conditions to smooth the texture of the cheese like product, such as cream cheese product. The second homogenization step is preferably conducted in a two-stage homogenizer.and, in principle, can be conducted at pressures of up to about 14,500 psi, although the pressure is generally at least about 500 psi. A range of about 500 to about 5,000 psi can be used, although 1,000 to 3,000 psi maybe preferable for some products. The second homogenization step is preferably conducted at a pressure about equal to or less than the first homogenization step.

In general, preferred products may be made using a higher first step homogenization pressure relative to the pressure in the second step homogenization. For instance, conducting the "5-step process" in which the pressure for the first step homogenization pressure was about 9000/1000 psi (first/second stage) and the pressure for the second step homogenization pressure was about 2500/500 psi (first stage/second stage) can yield a preferred product, such as a cream cheese like product. Reducing the pressure for first and second homogenization steps, such as to a 3500/500 psi and 500/0 psi respectively, can be used to obtain a less viscous product, such as a soft cream cheese-like product or a non-cream cheese product, such as a smoothie.

The product can be filled into suitable container(s). It can be directly or subsequently packaged for distribution, sale or storage. Optionally, the product obtained can, if desired, be cooled. Suitable chillers are known to those skilled in the art. It is preferred to hot fill and package the product. The product can then be refrigerated.

Directly consumable food products, condiments or other consumables can be packaged together. The food product and condiments or other consumables can be packaged together but in separate compartments or they may already be combined together as a ready-mix. For instance, a yogurt like product can be in one package compartment and a compatible consumable, such as a condiment, cookie "stir ins" or nuts, can be in another compartment. The consumer can combine the materials such as by stirring them together.

In an alternate embodiment of the present invention using acid whey or acid whey concentrate, the present method may be simplified to produce a variety of novel products capable of conferring creamy texture and providing cultured dairy notes including, but not limited to, desserts (non-whipped, whipped and frozen) and thick beverages (such as smoothies). A mixture of acid whey (or acid whey concentrate) and a fat source is formed in a mixer and heated to a temperature of up to a range of about 120° F. to about 180° F. The heated mixture is homogenized under a pressure of up to about 14,500 psi to obtain a homogeneous dispersion. Selected ingredients including sweeteners, a stabilizer system comprising gum and optionally starch, maltodextrin, emulsifier, flavor/color can be added to the homogenized mixture. The composition can then be heated to a temperature of less than 212° F., such as about 165° F. to about 210° F., preferably about 175° F. to about 185° F. for about 1 to about 120 minutes, preferably about 5 to about 30 minutes. The heated composition is homogenized again under a pressure of up to about 14,500 psi such as about 2500psi/500 psi to obtain a smooth, creamy and refreshing products or semi-products. The semi-products may be further processed, such as whipped in a Hobart mixer (to aerate) or frozen in an ice cream freezer (to aerate and freeze) to produce whipped and frozen desserts, respectively.

The present method can be simplified to enable a production of other value-added products, including a dessert product, including pudding, whipped toppings, and frozen novelty products. Such other dessert products typically include flavorings (such as strawberry, vanilla, chocolate, banana, tropical fruit and the like) and other ingredients, such as sweeteners, dairy protein, fat stabilizers, flavors and preservatives. Such other ingredients can be introduced at one or more suitable stages of manufacture, although flavoring ingredients, as above with cream cheese-like products, can be advantageously added, with appropriate blending, during or after the last heat treatment step. Lower-solids products, such as smoothie. type products, can also be prepared with all steps of the "5-step process" or, if desired, they may be prepared by customizing the procedures such as by mixing the concentrated cream cheese whey and optionally a separate dairy fat source to obtain a coarse emulsion, conducting a first heat treatment at a suitable selected temperature with mixing, optionally homogenizing in a homogenization treatment, preferably at a pressure in a range of about 2500 psi to 5000 psi, and preferably when a separate dairy fat source was included; preferably adding the stabilizer(s) or texture modifier(s) (gum, starch, maltodextrin, emulsifier and the like) such as after the first homogenization, and optionally heating the mixture in a second heat treatment, especially if a dairy fat source was added earlier in the process; and collecting the product. For instance, an exemplary formulation of a low-solids smoothie product includes about 47% concentrated cream cheese whey, about 9.5% sugar, about 5% corn starch syrup (e.g. HFCS-42 brand syrup having a 74% solids content), about 0.12% gum (locust bean gum), starch (e.g. Thermoflo, brand from National Starch & Chemical), fruit puree mix (such as a Strawberry Puree 28 Brix brand mix), fruit flavor (e.g. strawberry flavor), and acidulent. Water will usually constitute the balance in the formulation. An acidulent can be any common food acidulent such as lactic acid, malic acid, citric acid, tartaric acid, adipic acid or fumaric acid, and the amount that may be employed will vary as appreciated by those skilled in the art from this disclosure. The pH can vary from 3.5 to 5.5, if desired, and may be adjusted on a lower side, such as a pH 3.8 to 4.1, by the addition of a supplementary acidulent.

One simplified method of the present invention involves adding acid whey or acid whey concentrate, to a wide variety of flavored dairy drinks capable of conferring creamy texture and providing cultured dairy notes including, but not limited to coffee flavored, fruit flavored, chocolate flavored, vanilla flavored drinks. A mixture of acid whey (or acid whey concentrate), a stabilizer, flavor/color, buffering salts, an emulsifier and optionally a fat source and/or a dairy powder (such as non-fat dry milk powder) is formed in a mixer and heated to a temperature of above about 165° F. to about 210° F. for a time about 1 to 30 minutes. The heated mixture is optionally homogenized under a pressure of up to about 14,500 psi to obtain a creamy flavored dairy drink. The product is obtained as such or can be further processed, such as by cooling or freezing, as desired. As will be appreciated, suitable ingredients such as flavor, color can be added during the process as will be appreciated by those skilled in the art from this disclosure.

The end product can be an ice cream like product when a suitable consistency product obtained after the treatments and optional flavoring is pre-chilled and processed through an ice cream apparatus before packaging. An example of a commercially available suitable ice cream apparatus is a soft serve freezer.

As used herein designations for homogenization pressure may indicate a two-stage homogenization process. The first stage may break up oil droplets and the second stage may reduce the tendency of droplets to re-coalesce. Pressure ranges given for a homogenization treatment may be with reference to the first stage in any multi-stage homogenizer unless indicated otherwise. In one aspect of the invention, a two-stage homogenization will preferably have a pressure of about 2,000 psi to about 4,500 psi in the first stage and about 0 to about 500 psi in the second stage. It will be appreciated that in a given homogenization treatment stage that a single stage homogenizer may be used.

The products obtained according to the methods described herein include natural dairy calcium and other nutritionally valuable minerals and vitamins. Of course, additional calcium or other nutritionally valuable minerals and vitamins can be added if desired.

The following examples describe and illustrate the processes and products of the invention. These examples are intended to be merely illustrative of the present invention, and not limiting thereof in either scope or spirit. Those skilled in the art will readily understand that variations of the materials, conditions, and processes described in these examples can be used. All references cited herein are incorporated by reference in their entirety. Unless otherwise noted, all percentages are by weight of the noted composition.

EXAMPLES

Example 1

This example demonstrates at the lab scale that a cream cheese-like product can be made directly from CCW without culturing step or addition of curd.

Concentrated Cream Cheese Whey (CCW) (77% moisture content, 10.3% fat, 7.4% protein, 2.54% lactose having a pH 4.2) was homogenized in a high pressure homogenizer (Cavipro brand homogenizer) at 5,000 psi or at 10,000 psi with incorporation of 0%, 10% or 20% anhydrous milk fat (AMF), with the percent relating to the total weight of the product to obtain a homogenate. The homogenization was conducted at 140° F. The homogenate was heated in a small lab heating/cooling device with gentle continuous mixing (a rapid viscograph analyzer, "RVA", from Newport Scientific) at a heat rate sufficient to achieve about 57° F./min until about 185° F. was reached, and the temperature was maintained for about 30 minutes, before being cooled down to about 86° F. Apparent viscosity was continuously monitored during the heating and cooling cycle. Viscosity and yield stress were also measured after the product was cooked.

The mouth feel and other "organoleptic" properties of the resulting sample obtained were determined. It had the appearance and taste of a cream cheese-like product. Generally, higher fat content and high homogenization pressure provide firmer products.

Example 2

A Cream Cheese-like Product was Made at the Lab-bench.

The following ingredients were used: 13.77% anhydrous milk fat (AMF), 75% liquid concentrated acid cream cheese whey (CCW, 88.6% mosiutre, 1.37% fat, 3.7% protein, 4.2% lactose), 4.7% of a WPC 34 (WPC 34 from Wisconsin Whey International, Wis.), 4.31% WPC 8000,1.% of a maltodextrin (C-delight® MD 01970 brand maltodextrin), 0.05% of xanthan gum, 0.36% of a carob gum, 0.78% salt (NaCI), and 0.03% of sorbic acid.

A product having a higher yield stress was produced as follows using the foregoing ingredients. The CCW and anhydrous milk fat (AMF) were separately preheated to approximately 110F. The WPC 34 and WPC 8000 were mixed. The pH was about 4.85 to 4.86. The warmed AMF was added to the WPC mixture and mixed for about a minute or so to obtain a coarse mixture. The coarse mixture was heated in a Stepan cooker at a temperature of up to about 140° F. The slurry that was obtained was homogenized at a pressures of 3000 psi and 500 psi. The salt, gum, starch (maltodextrin) can be combined or kept separate, but were added to the homogenized product. The homogenized product with the additives was then heated to about 170° F. for about 30 minutes. The moisture content can, if desired, be checked and water added as desired. The heated product was then homogenized a second time, in a two-stage homogenizer, at 3000 and 500 psi. The product was hot filled into a container, sealed, and ready for later use.

A cream cheese-like product was obtained.

Example 3

Products having firmer texture were obtained by adding the gum(s), maltodextrin, and salt after the first homogenization. The general method was similar to Example 2, but the first homogenization was conducted at 10,000 psi, the second-heating step was conducted at about 180° F. for about 20 minutes, and the second homogenization was conducted at 3,500 psi. The product formulation was as follows (% are weight percent):

| INGREDIENT | % |
|---|---|
| AMF | 13.11 |
| CCW | 75.05 |
| FDA 50 | 9.62 |
| Sorbic Acid | 0.03 |
| Salt | 0.78 |
| C-Delight MD ® 01970 | 1.00 |
| Carob | 0.36 |
| Xanthan | 0.05 |
| Finished Product | 100.00 |

Example 4

This example demonstrates cream cheese-like products can be scaled up to pilot or semi-commercial scale.

Soft cream cheese products were be obtained by methods of the present invention. It is possible to adjust the acidity of the blend before conducting a process according to the present invention. This is illustrated by a sample with the following formulation.

| Ingredient | Sample |
|---|---|
| AMF | 13.07 |
| CCW | 74.68 |
| FDA 50 | 9.09 |
| Sorbic Acid | 0.05 |
| Lactic Acid (88% soln.) | 0.30 |
| Salt | 0.90 |
| C*-deLight ® MD 01970 | 1.50 |
| Carob | 0.36 |
| Xanthan | 0.05 |
| Total | 100.00 |
| Water Adjustment | 1.00 |

The above-reference to water adjustment refers to water added to compensate for evaporation.

The sample was prepared by mixing the anhydrous milk fat, the CCW (pH 4.2, 1.86% fat, 88% water, 3.8% protein, and 4.1% lactose), and a powdered WPC (FDA 50) and the acids in a Breddo mixer; placing the mixture into a kettle and heating to about 140° F., homogenizing the mixture at about 10,000 psi, adding the gum(s), salt and maltodextrin, agitating for about 5 minutes to obtain even distribution, heating to a temperature of about 180° F. for about 20 minutes, homogenizing at about 3,500 psi and filling product into container(s).

Example 5

A creamy, stable refreshing flavored milk shake product was produced by blending 81.25 grams of the CCW, 5 grams additional concentrated milk fat (CMF) and 3.55 grams non-fat dairy milk (NFDM). The mixture was heated to 140° F. in a cooker (Stephen cooker) and was then homogenized at 4500 psi and 500 psi (two-stage homogenizer) to form a texturized emulsion. An additional 10 grams of sweetener (sugar), 0.2 gram of locust bean gum, flavoring(s), and colorant(s) were added, followed by heating to about 180° F. to obtain a mixture. This mixture was homogenized at a lower pressure of 2500 psi and 500 psi in a two-stage homogenizer (manufactured by APV).

Example 6

A creamy, thick dairy dessert was made by blending 76.25 grams of CCW with 10 grams of additional fat (CMF, concentrated milk fat) and 3.55 grams non-fat dairy milk (NFDM), with the materials being well blended, heating the blend (mixture) to 140° F. in a cooker (Stephen cooker), and homogenizing the heated blend at 4500 psi and 500 psi to form a texturized emulsion (homogeneous fat-protein emulsion). To the texturized emulsion composition was added a sweetener (10 grams of sugar), 0.2 gram of locust bean gum, and flavor/color. The composition was then heated at a rate of about 4° F./minute over a 15 minute period to about 180° F., and the composition was homogenized again at a lower pressure of about 2500 psi and 500psi to obtain a flavored, thick dessert type product.

The dessert product had a smooth, creamy texture and included micronutrients from milk such as vitamins and minerals, and surprisingly had a desirable natural dairy flavor profile.

A thick dessert type product can be prepared with or without fruit puree, juice, flavor and/or colorant, although ingredients (such as flavor(s) and/or a selected color(s)) can, if desired, be blended in afterwards.

Example 7

A creamy, refreshing strawberry flavored whipped dessert was prepared by blending 92.4 grams of a composition prepared according to Example 6, 7.4 grams of a whipping component (which can be fat based or protein based), 0.1 gram xanthan gum and strawberry flavor/color in a Hobart mixer. The mixer was first set on low speed for about two minutes, and was then set to a high whipped speed for four minutes. The whipped product obtained was stored overnight under refrigeration at a temperature of about 40° F.

As will be appreciated, a desired level thickness to the whipped product was an object of the mixing. Therefore, the second mixing stage was conducted for such period of time until the desired texture and thickness to the whipped product was obtained.

Example 8

A creamy coffee flavored drink having a rich dairy flavor and creamy mouthfeel was prepared by mixing 63.1 grams of water, 29 grams of texturized acid whey emulsion (such as prepared as in Example 6), 7.0 grams of a sweetener (sugar), 0.4 grams of instant coffee, 0.08 gram of cocoa, 0.05 gram of buffer (potassium bicarbonate), 0.28 gram of another buffer (disodium phosphate), 0.05 gram of Myverol® brand emulsifier (consists essentially of monoglycerides), and 0.016 gram of carragennan (Seakem® GP 418 FMC brand carragennan). A lightening mixer was used at a mix setting of about 800 rpm. The mixture was heated to about 165° F. and was homogenized at 4500 psi and 500 psi in a two-stage homogenizer. A coffee flavored drink product having a creamy mouthfeel and other desired organoleptic characteristics was obtained.

What we claim is:

1. A method for producing a creamy dairy product, comprising:
    (a) mixing concentrated acid whey and an edible fat to obtain a first mixture;
    (b) heating said first mixture to a temperature of up to about 200° F.;
    (c) homogenizing said heated first mixture under a pressure of up to about 14,500 psi and for a time effective to obtain a homogeneous dispersion;
    (d) adding salt and a stabilizing amount of a stabilizer system comprising hydrocolloid and optionally emulsifier, and mixing to obtain a second mixture;
    (e) heating the second mixture up to a range of about 165° F. to about 210° F. for 1 minute to about 2 hours to texturize the second mixture;
    (f) homogenizing said heated second mixture under a pressure of up to about 14,500 psi and for a time effective to obtain a homogeneous mixture; and
    (g) collecting the resultant dairy product.

2. The method according to claim 1, wherein in (a) said edible fat is milk fat.

3. The method according to claim 1, wherein in (a) said acid whey concentrate has a pH of about 3.5 to about 5.5.

4. The method according to claim 1, wherein (b) said homogenizing of said heated first mixture includes a homogenizing step at a pressure in the range of about 2,500 psi to about 14,500 psi.

5. The method according to claim 1, wherein (b) said homogenizing of said heated first mixture is conducted at a pressure of about 3,500 psi to about 10,000 psi.

6. The method according to claim 1, wherein in (f) said homogenizing of said heated second mixture is conducted at a pressure in the range of about 500 psi to about 14,500 psi.

7. The method according to claim 1, wherein in (f) said homogenizing of said heated second mixture is conducted at a pressure of about 500 psi to about 5,000 psi.

8. The method according to claim 1, further comprising in (d) admixing at least one additive selected from the group consisting of a flavorant and a colorant.

9. The method according to claim 1, wherein in (d) said stabilizer system comprises at least one material selected from the group consisting of maltodextrin, carob gum, xanthan gum, and carrageenan and,optionally, emulsifier.

10. The method according to claim 1, wherein in (d) said stabilizer system comprises maltodextrin, carob gum and xanthan gum.

11. The method according to claim 1, wherein in (d) said stabilizer system comprises maltodextrin, carob gum, and carrageenan.

12. The method according to claim 1, wherein in (d) said stabilizer system comprises carob gum and at least one of xanthan gum and carrageenan.

13. The method according to claim 1, wherein in (a) said first mixture further includes an emulsifier.

14. The method according to claim 1, wherein in (a) said first mixture further includes dry whey protein concentrate.

15. The method according to claim 1, wherein in (a) said first mixture has a protein content of up to about 20%.

16. The method according to claim 1, wherein in (g) said collecting comprises hot-filling the resultant dairy product into containers.

17. The method according to claim 1, wherein said concentrated acid whey comprises concentrated cream cheese whey containing about 0.1 to about 20% fat and about 0.5 to about 20% protein.

18. The method according to claim 1, wherein said dairy product comprises a cream cheese product.

19. The method according to claim 1, wherein said dairy product comprises a beverage.

20. The method according to claim 1, wherein said dairy product comprises a whipped product.

21. The method according to claim 1, wherein said dairy product comprises a frozen product.

22. A method for producing a creamy dairy product, comprising:
    (a) preparing a first mixture containing about 10 to about 99% concentrated acid whey, about 0% to about 20 percent dairy powder that contains protein, and about 0.01% to about 35% of an edible fat, with mixing;
    (b) heating said first mixture to a temperature of up to a range of about 120° F. to about 180° F.;
    (c) homogenizing said heated first mixture under a pressure of up to about 14,500 psi and for a time effective to obtain a homogeneous dispersion;
    (d) adding a stabilizing amount of a stabilizer system comprising a gum, and optionally salt, and mixing to obtain a second mixture, said second mixture containing about 0 to about 2.5% salt, about 0.01 to about 1.0% total gum, about 0 to about 20% maltodextrin, about 0% to about 5.0% starch, about 0 to about 1.0% food emulsifier and up to about 20% of a sweetener;
    (e) optionally heating the second mixture up to a range of about 165° F. to about 210° F.;
    (f) homogenizing said heated second mixture under a pressure of up to about 14,500 psi and for a time effective to obtain a homogeneous dispersion; and
    (g) collecting the resultant dairy product.

23. The method according to claim 22, wherein said dairy product comprises a cream cheese product.

24. The method according to claim 22, wherein said dairy product comprises a beverage, a dessert, a whipped topping, or a frozen novelty product.

* * * * *